US012339558B2

United States Patent
Hayashi

(10) Patent No.: US 12,339,558 B2
(45) Date of Patent: Jun. 24, 2025

(54) ARRAY SUBSTRATE AND DISPLAY DEVICE

(71) Applicant: Japan Display Inc., Tokyo (JP)

(72) Inventor: Hirotaka Hayashi, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 541 days.

(21) Appl. No.: 17/719,381

(22) Filed: Apr. 13, 2022

(65) Prior Publication Data

US 2022/0342271 A1   Oct. 27, 2022

(30) Foreign Application Priority Data

Apr. 26, 2021  (JP) ................................. 2021-074264

(51) Int. Cl.
  *G02F 1/167* (2019.01)
  *G02F 1/16766* (2019.01)

(52) U.S. Cl.
  CPC .......... *G02F 1/167* (2013.01); *G02F 1/16766* (2019.01)

(58) Field of Classification Search
  CPC .............................. G02F 1/167; G02F 1/16766
  USPC ......................................................... 359/296
  See application file for complete search history.

(56) References Cited

U.S. PATENT DOCUMENTS

2016/0359055 A1* 12/2016 Shang ............... H01L 29/66969
2017/0040403 A1*  2/2017 Kuwabara ......... H01L 29/78672
2018/0046006 A1*  2/2018 Yamazaki ................. G09F 9/40
2019/0081085 A1   3/2019 Ozeki et al.
2020/0251597 A1   8/2020 Ikeda et al.

FOREIGN PATENT DOCUMENTS

| CN | 103728803 A | 4/2014 |
| CN | 104409513 A | 3/2015 |
| CN | 107731172 A | 2/2018 |
| JP | 2017-37301 A | 2/2017 |
| JP | 2019049627 A | 3/2019 |
| JP | 2020-126218 A | 8/2020 |

OTHER PUBLICATIONS

Machine translation of Japanese Office Action issued Aug. 7, 2024, in corresponding Japanese Patent Application No. 2021-074264, 4pp.
Chinese Office Action issued Dec. 26, 2024, in corresponding Chinese Application No. 202210440952.X, 9pp.

* cited by examiner

*Primary Examiner* — William Choi
(74) *Attorney, Agent, or Firm* — XSENSUS LLP

(57) ABSTRACT

According to one embodiment, an array substrate includes a semiconductor layer, a first electrode in contact with the semiconductor layer, a second electrode separated from the first electrode and in contact with the semiconductor layer, a first insulating layer which covers the first electrode and the second electrode, a gate electrode disposed above the first insulating layer and opposing the semiconductor layer, and the semiconductor layer comprising an aperture located between the first electrode and the second electrode in plan view.

21 Claims, 10 Drawing Sheets

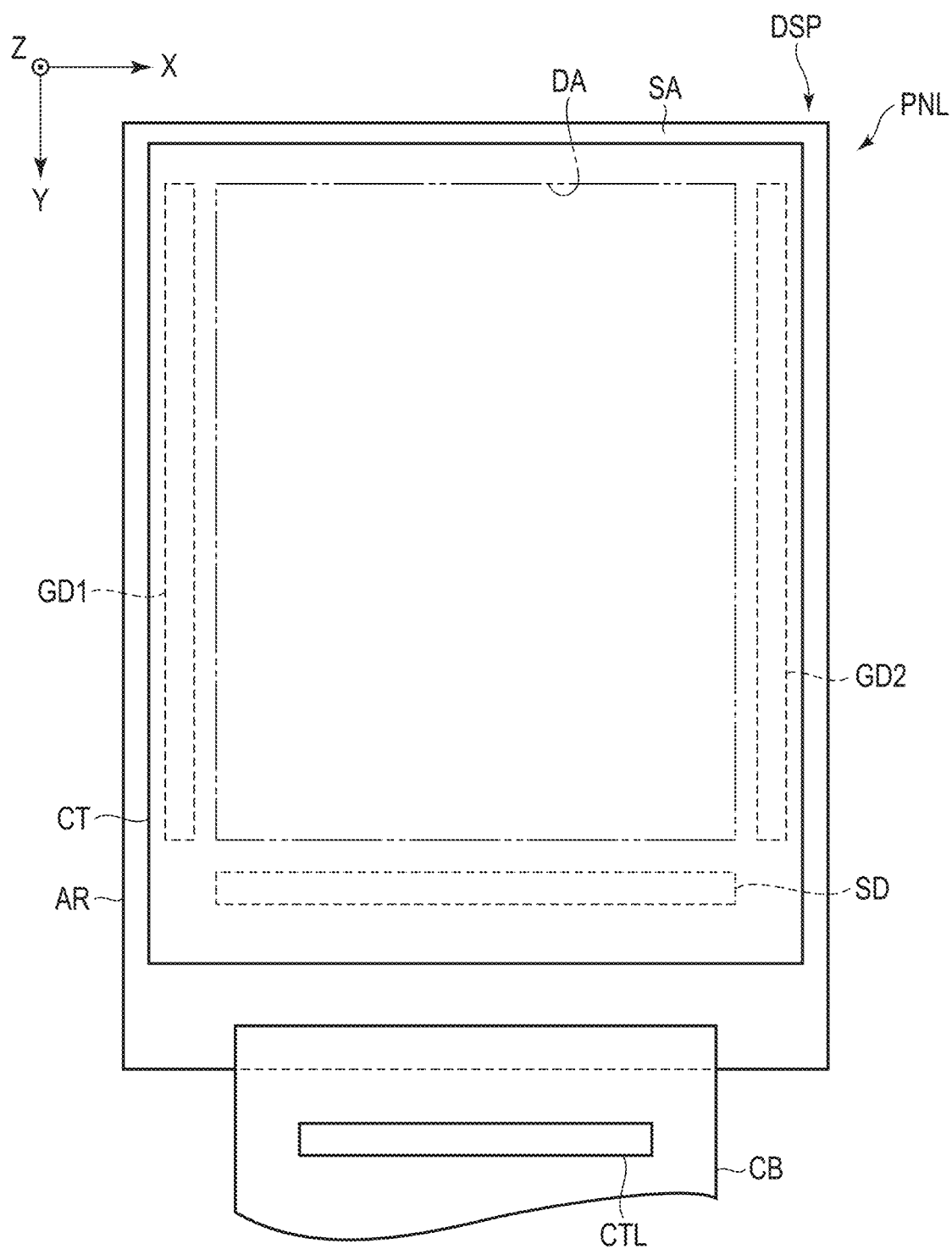
F I G. 1

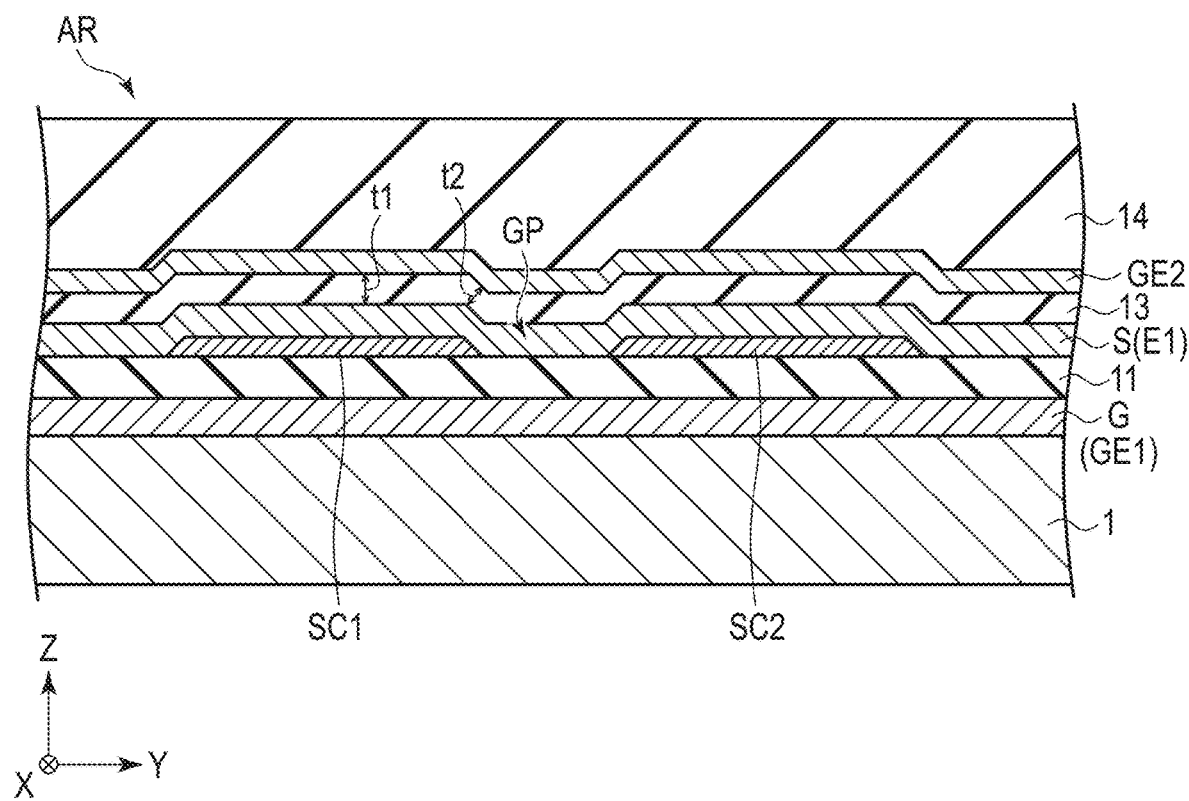
F I G. 11

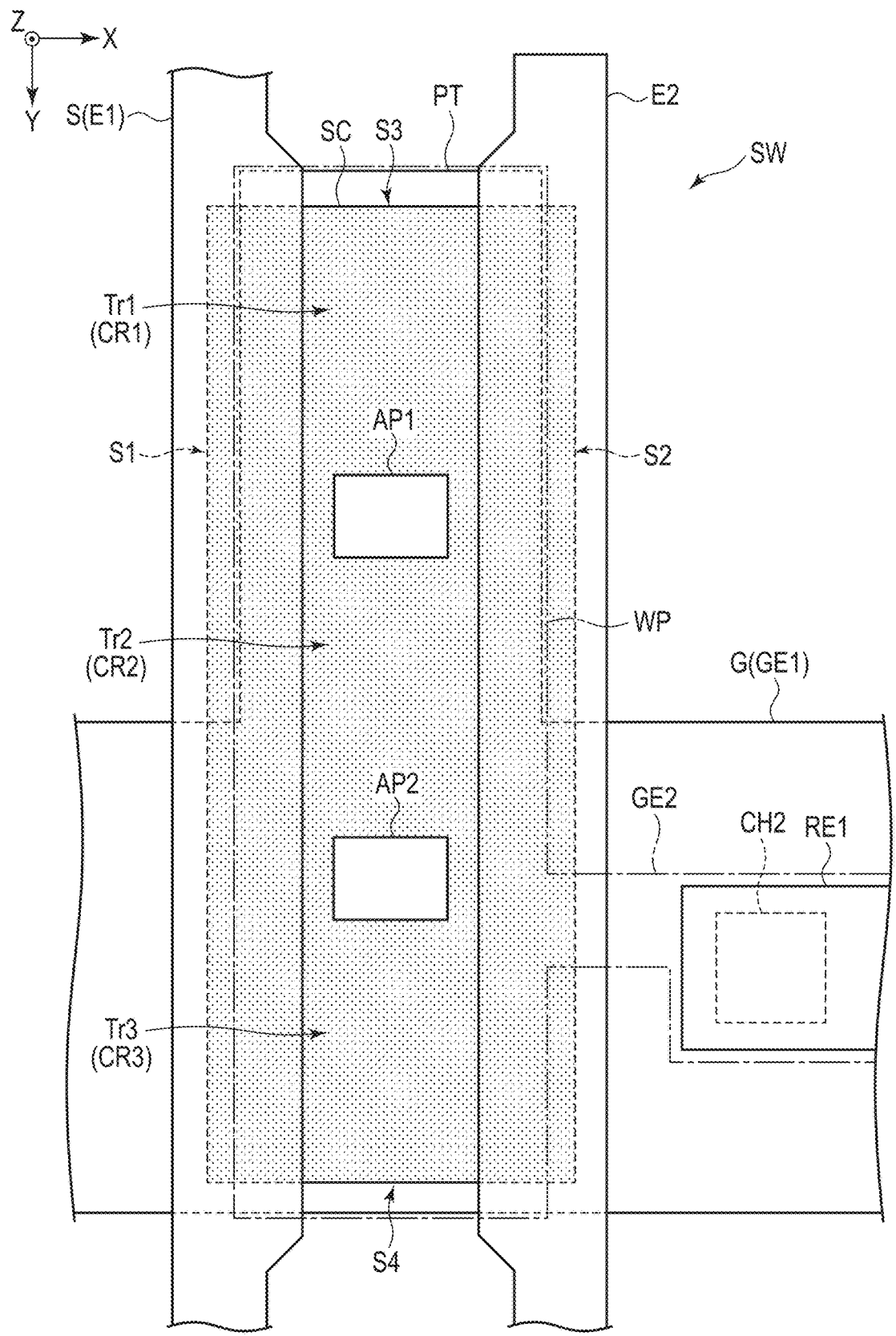
F I G. 12

ARRAY SUBSTRATE AND DISPLAY DEVICE

CROSS-REFERENCE TO RELATED APPLICATIONS

This application is based upon and claims the benefit of priority from Japanese Patent Application No. 2021-074264, filed Apr. 26, 2021, the entire contents of which are incorporated herein by reference.

FIELD

Embodiments described herein relate generally to an array substrate and a display device.

BACKGROUND

Display devices such as electrophoretic display devices and liquid crystal displays comprise an array substrate on which thin-film transistors are formed. In array substrates, a plurality of thin-film transistors may be arranged close to each other. Here, if the insulation layer between two conductive layers located above the semiconductor layers becomes locally thin due to a step created by the semiconductor layers of the thin film transistors, dielectric breakdown may occur.

BRIEF DESCRIPTION OF THE DRAWINGS

FIG. 1 is a plan view showing a configuration of a display device according to the first embodiment.

FIG. 11 is a cross-sectional view schematically showing the array substrate of the comparative example.

FIG. 12 is a plan view schematically showing a switching element according to the second embodiment.

DETAILED DESCRIPTION

Figure 2:
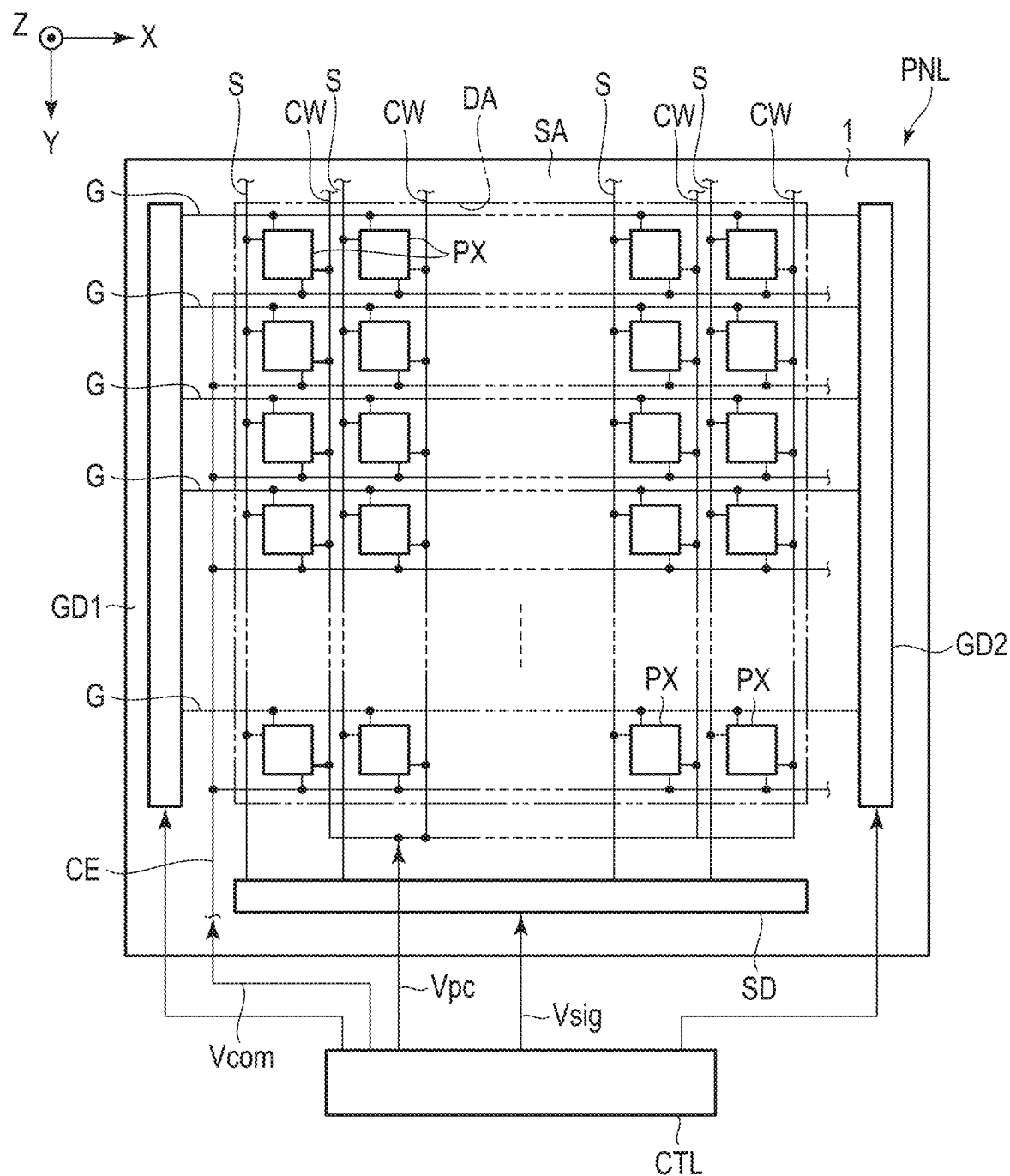
FIG. 2 is a schematic circuit diagram of the display device of the first embodiment.

In general, according to one embodiment, an array substrate comprises a semiconductor layer, a first electrode in contact with the semiconductor layer, a second electrode separated from the first electrode and in contact with the semiconductor layer, a first insulating layer which covers the first electrode and the second electrode, a gate electrode disposed above the first insulating layer and opposing the semiconductor layer, and the semiconductor layer comprising an aperture located between the first electrode and the second electrode in plan view.

According to one embodiment, a display device comprises the above-mentioned array substrate, a counter substrate opposing the array substrate and a display functional layer disposed between the array substrate and the counter substrate.

According to such configurations, it is possible to provide an array substrate with excellent reliability and a display device comprising the array substrate.

Embodiments will be described hereinafter with reference to the accompanying drawings.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

In each embodiment, an electrophoretic display device and an array substrate of this display device are disclosed as an example. However, each embodiment does not preclude the application of individual technical ideas disclosed in each embodiment to other types of display devices. Other types of display devices include, for example, liquid crystal displays comprising a liquid crystal layer, organic electroluminescent display devices in which a light-emitting layer is arranged in each pixel, LED display devices in which a small LED is disposed in each pixel. Further, the array substrates disclosed in the embodiments can as well be applied to various electronic devices that do not have display functions.

When the configurations disclosed in the embodiments are applied to liquid crystal display devices, such display devices may be a so-called polymer dispersion liquid crystal display (PDLC) devices. Liquid crystal display devices of this type display images by switching between a scattering state in which light is scattered and a transmission state in which light is transmitted in the liquid crystal layer of each pixel. Such a polymer-dispersion liquid crystal display (PDLC) is used as a transparent display in which the background on a rear side of the panel can be seen through when viewed from the image display side (the panel surface), and similarly, the background on the image display surface side can be seen through when viewed from the rear side of the panel.

First Embodiment

FIG. 1 is a plan view of a display device DSP of the first embodiment. As shown in FIG. 1, a first direction X, a second direction Y and a third direction Z are defined. In this embodiment, the first direction X, the second direction Y and third direction Z are orthogonal to each other. But, the first direction X, the second direction Y, and the third direction Z may intersect at an angle other than 90 degrees. The first direction X and the second direction Y are parallel to the main surface of each substrate of the display device DSP. The third direction Z corresponds to the thickness direction of each element of the display device DSP.

In the following descriptions, with such expressions "a second member above a first member" and "a second member below a first member", the second member may be in contact with the first member or may be remote from the first member. In the latter case, a third member may be interposed between the first member and the second member. Viewing the display device DSP and its components parallel to the third direction Z is referred to as planar view.

The display device DSP includes an active matrix display panel PNL, a wiring substrate CB and a controller CTL. The display panel PNL comprises an array substrate AR and a counter substrate CT opposing the array substrate AR along the third direction Z. In the example shown in FIG. 1, the array substrate AR and the counter substrate CT are each rectangular in shape with short sides parallel to the first direction X and long sides parallel to the second direction Y. Note that the shape of the array substrate AR and the counter substrate CT are not limited to that of this example.

The display panel PNL includes a display area DA which displays images and a peripheral area SA which surrounds the display area DA. In this embodiment, the peripheral area SA is frame-shaped. Further, the display panel PNL comprises gate drivers GD1 and GD2 and a source driver SD. The gate drivers GD1 and GD2 supply scanning signals to scanning lines, which will be described later. The source driver SD supplies image signals to signal lines, which will be described later.

The circuit board CB is connected to the array substrate AR. The controller CTL is an IC chip, for example, and is mounted on the circuit board CB. The controller CTL supplies drive signals to the gate drivers GD1 and GD2, and the source driver SD via the wiring substrate CB. The controller CTL may be mounted at some other location, for example, on the array substrate AR.

Figure 3:
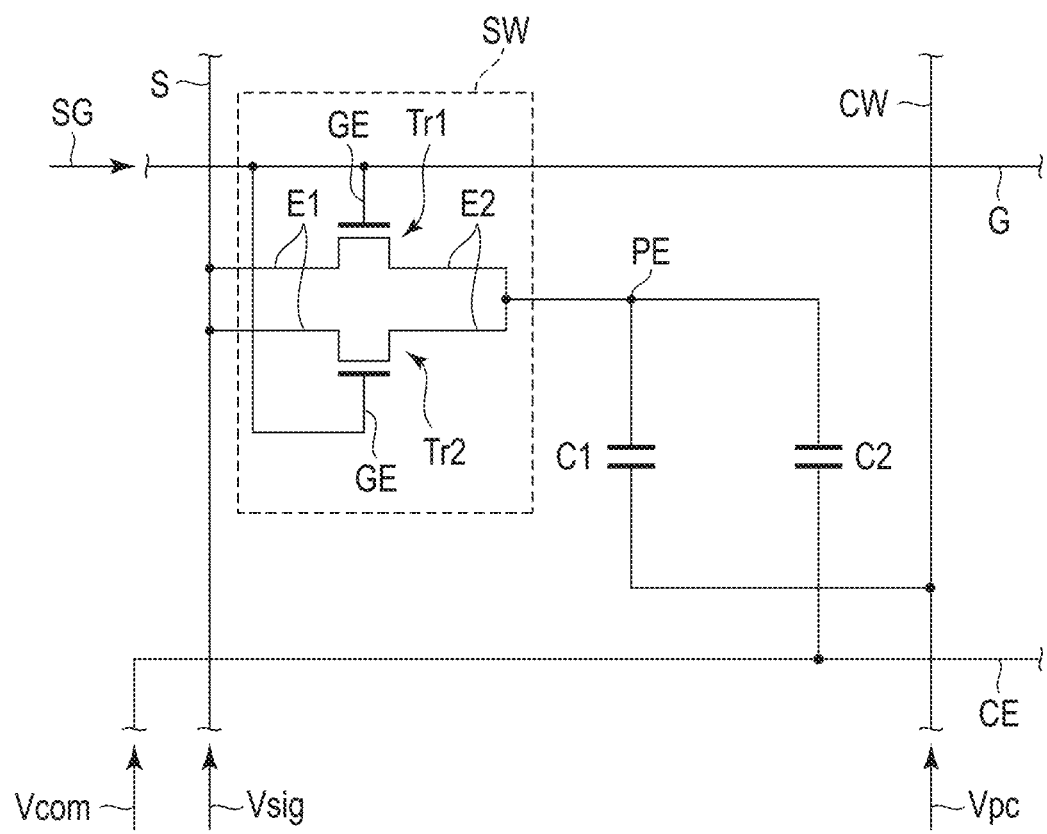
FIG. 3 is an equivalent circuit diagram applicable to a pixel shown in FIG. 2.

FIG. 2 is a schematic circuit diagram of the display device DSP. FIG. 3 is an equivalent circuit diagram applicable to a pixel PX shown in FIG. 2. As shown in FIGS. 2 and 3, the display panel PNL comprises a first base 1, a plurality of pixels PX, a plurality of scanning lines G, a plurality of signal lines S, a plurality of capacitive wiring lines CW, and a common electrode CE. The pixels PX are arranged in a matrix in the display area DA. The pixels PX, the scanning lines G, the signal lines S and the capacitive wiring lines CW are disposed above the first base 1.

The scanning lines G extend along the first direction X and are aligned along the second direction Y. Each scanning line G is connected to one of the gate drivers GD1 and GD2, and is also connected to those pixels PX aligned along the first direction X. The signal lines S extend along the second direction Y and are aligned along the first direction X. Each signal line S is connected to the source driver SD and to those pixels PX aligned along the second direction Y. The capacitive wiring lines CW extend along the second direction Y and are aligned along the first direction X. Each capacitive wiring line CW is connected to the controller CTL and connected to those pixels PX aligned along the second direction Y.

The gate drivers GD1 and GD2 supply scanning signals SG to the scanning lines G. The controller CTL supplies image signals (or video signals) Vsig to the source driver SD. The source driver SD supplies the image signals Vsig to the corresponding signal lines S. The controller CTL supplies a voltage Vpc to the capacitive wiring lines CW. Further, the controller CTL supplies a common voltage Vcom to the common electrode CE. For example, the voltage Vpc and the common voltage Vcom are at the same potential.

As shown in FIG. 3, each pixel PX comprises a switching element SW, a first capacitance C1, a second capacitance C2 and a pixel electrode PE. In this embodiment, the switching element SW includes a first transistor Tr1 and a second transistor Tr2.

The first transistor Tr1 and the second transistor Tr2 are thin-film transistors (TFT) of the same conductivity type, for example, a P-channel. The semiconductor layers of the first transistor Tr1 and the second transistor Tr2 are each formed of an oxide semiconductor. Note that, as the semiconductor layers described above, semiconductors other than oxide semiconductors, such as a polycrystalline silicon such as low-temperature polycrystalline silicon or amorphous silicon, may be used. Further, the first transistor Tr1 and the second transistor Tr2 may as well be formed from an N-channel TFT.

Both the first transistor Tr1 and the second transistor Tr2 are thin-film transistors (TFT) and include a first electrode E1, a second electrode E2 and a gate electrode GE. One of the first electrode E1 and the second electrode E2 functions as a source electrode and the other functions as a drain electrode. The first transistor Tr1 and the second transistor Tr2 are connected in parallel between the respective signal line S and the respective pixel electrode PE.

In each of the first transistor Tr1 and the second transistor Tr2, the first electrode E1 is connected to the signal line S, the second electrode E2 is connected to the pixel electrode PE, and the gate electrode GE is connected to the scanning line G. With this configuration, the first transistor Tr1 and the second transistor Tr2 are each switched to a conducting or non-conducting state by the scanning signal SG applied to the scanning line G. The image signal Vsig is supplied to the pixel electrode PE via the signal line S and the transistors Tr1 and Tr2 which are in the conducting state.

The first capacitance C1 is connected to the pixel electrode PE and the capacitive wiring line CW. The second capacitance C2 is connected to the pixel electrode PE and the common electrode CE.

Figure 4:
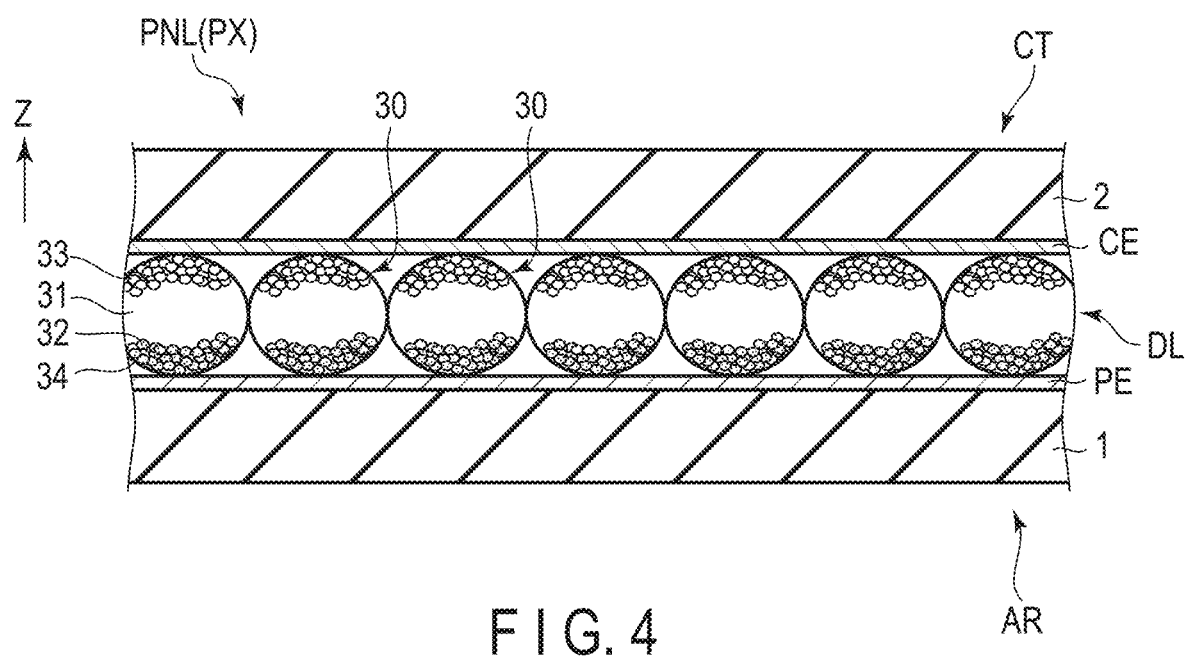
FIG. 4 is a cross-sectional view schematically showing a display panel of the display device of the first embodiment.

FIG. 4 is a schematic cross-sectional view of the display panel PNL. Here, one pixel PX is focused on. As shown in FIG. 4, the array substrate AR comprises a first base 1 and a pixel electrode PE provided on the first base 1. The counter substrate CT comprises a second base 2 and a common electrode CE opposing the pixel electrode PE. For example, the common electrode CE is made of a transparent conductive material such as indium tin oxide (ITO) or indium zinc oxide (IZO).

The first base 1 and the second base 2 are formed of, for example, an insulating material such as plastic or glass. In this embodiment, the second base 2 is located on a screen side (an observation side) and is light-transmissive. The first base 1 is located on an opposite side to the screen and therefore, it may be opaque or transparent.

The display panel PNL comprises a display functional layer DL located between the array substrate AR and the counter substrate CT. The voltage applied between the pixel electrode PE and the common electrode CE acts on the display functional layer DL. In this embodiment, the display functional layer DL is an electrophoretic layer and contains a plurality of microcapsules 30 disposed with almost no gaps therebetween in the X-Y plane.

The microcapsules 30 have a spherical shape having a particle diameter of, for example, 20 μm to 70 μm. In the example illustrated, a number of microcapsules 30 are placed between one pixel electrode PE and the common electrode CE. Note that the number of microcapsules 30 placed between one pixel electrode PE and the common electrode CE may be less than that of the example illustrated.

The microcapsules 30 each comprises a dispersant 31, a plurality of black particles 32, a plurality of white particles 33 and an outer shell 34. The black particles 32 and the white particles 33 may be referred to as electrophoretic particles. The outer shell 34 is formed, for example, from a transparent resin such as acrylic resin. The dispersant 31 is a liquid in which the black particles 32 and the white particles 33 are dispersed within the microcapsule 30.

The black particles 32 are particles (polymeric or colloidal) made of, for example, black pigment such as aniline black, and are, for example, positively charged. The white particles 33 are particles (polymeric or colloidal) made of, for example, white pigment such as titanium dioxide, and are, for example, negatively charged. To these pigments, various types of additives can be added as needed. In place of the black particles 32 and the white particles 33, pigments such as red, green, blue, yellow, cyan, magenta and the like, may be used, for example.

In the display functional layer DL of the above-described configuration, to display black on a pixel PX, the pixel electrode PE is held at a potential relatively higher than that of the common electrode CE. That is, when the potential of the common electrode CE is set as a reference potential, the pixel electrode PE is held at a positive polarity. Thus, the positively charged black particles 32 are attracted to the common electrode CE, while the negatively charged white particles 33 are attracted to the pixel electrode PE. As a result, black color is visually recognized when the pixel PX is observed from a common electrode CE side. On the other hand, to display white on the pixel PX, the pixel electrode PE is held at a negative polarity when the potential of the common electrode CE is set as the reference potential. Thus, the negatively charged white particles 33 are attracted towards the common electrode CE, while the positively charged black particles 32 are attracted towards the pixel electrode PE. As a result, white color is visually recognized when the pixel PX is observed.

Figure 5:
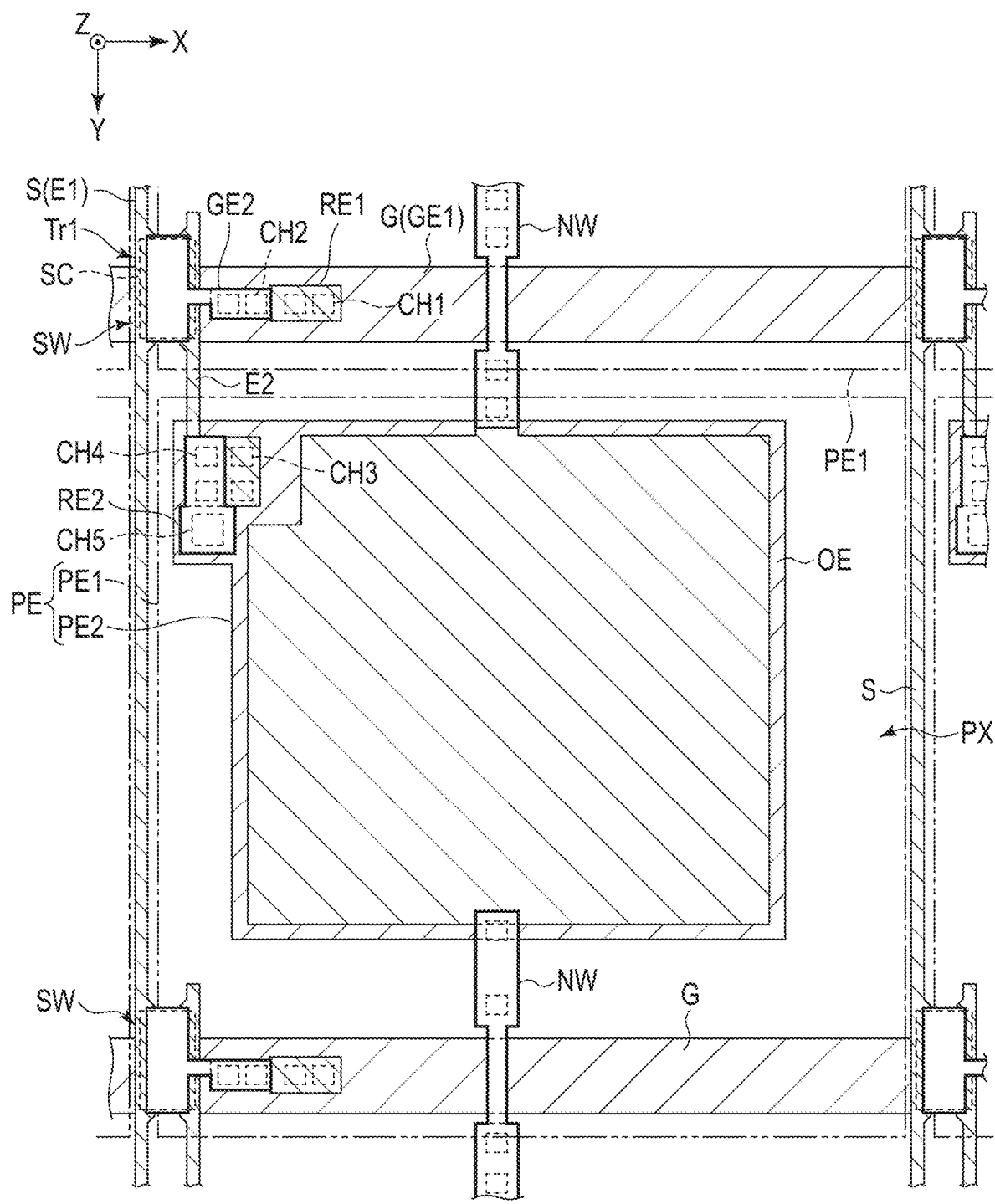
FIG. 5 is a plan view schematically showing the main elements disposed on an array substrate of the first embodiment.

FIG. 5 is a schematic plan view of the main elements disposed on the array substrate AR. In this figure, one pixel PX and its surrounding structure are shown. As described above, the scanning lines G extend along the first direction X. The signal lines S extend along the second direction Y and intersect the scanning lines G.

The pixel electrode PE includes a first pixel electrode PE1 and a second pixel electrode PE2 electrically connected to each other. In the example shown in FIG. 5, the second pixel electrode PE2 is located in an area enclosed by respective two scanning lines G and respective two signal lines S. The first pixel electrode PE1 is also located mostly in the area, but a part thereof overlaps the scanning line G shown in the lower part of the figure.

The switching element SW is located at the location where the respective scanning line G and the respective signal line S intersect each other. The switching element SW comprises a semiconductor layer SC. With the semiconductor layer SC, the first electrode E1 and the second electrode E2 are in contact. For example, the first electrode E1 may be referred to as a source electrode, and the second electrode E2 as a drain electrode. In this embodiment, the first electrode E1 is a part of the respective signal line S. The second electrode E2 is separated from the signal line S along the first direction X and extends along the second direction Y. A part of the second electrode E2 overlaps the second pixel electrode PE2.

The semiconductor layer SC overlaps the first gate electrode GE1 and the second gate electrode GE2. The first gate electrode GE1 and the second gate electrode GE2 constitute a gate electrode GE1 shown in FIG. 3. The semiconductor layer SC is located between the first gate electrode GE1 and the second gate electrode GE2 along the third direction Z. In this embodiment, the first gate electrode GE1 is a part of the respective scanning line G.

In the vicinity of the second gate electrode GE2, a first relay electrode RE1 is disposed. The first relay electrode RE1 is connected to the respective scanning line G via a contact hole CH1. The second gate electrode GE2 is connected to the first relay electrode RE1 via a contact hole CH2.

In each pixel PX, a capacitance electrode OE is disposed. The capacitance electrode OE overlaps the first pixel electrode PE1 and the second pixel electrode PE2. In this embodiment, the entire capacitance electrode OE is located on an inner side of an outer shape of the first pixel electrode PE1 and the second pixel electrode PE2 in plan view.

The capacitance electrodes OE disposed in each pair of pixels PX adjacent to each other along the second direction Y are connected to each other by a connection wiring line NW. The connection wiring line NW extends long in the second direction Y and intersects the respective scanning line G. A plurality of connection wiring lines NW and a plurality of capacitance electrodes OE aligned along the second direction Y constitute a capacitive wiring line CW shown in FIG. 3.

The second electrode E2 is connected to the second pixel electrode PE2 via a contact hole CH3. Between the second electrode E2 and the first pixel electrode PE1 along the third direction Z, a second relay electrode RE2 is disposed. The second relay electrode RE2 is connected to the second electrode E2 via a contact hole CH4. The second relay electrode RE2 is connected to the first pixel electrode PE1 via a contact hole CH5. Thus, the second electrode E2, the second relay electrode RE2, the first pixel electrode PE1 and the second pixel electrode PE2 are electrically connected to each other.

The scanning line G and the second pixel electrode PE2 are formed in the same layer from the same material. The signal line S, the second electrode E2, the first relay electrode RE1 and the capacitance electrode OE are formed in the same layer from the same material. The second gate electrode GE2, the second relay electrode RE2 and the connection wiring line NW are formed in the same layer from the same material.

For example, the scanning line G, the second pixel electrode PE2, the signal line S, the second electrode E2, the first relay electrode RE1, the second relay electrode RE2, the capacitance electrode OE, the connection wiring line NW and the second gate electrode GE2 are formed of, for example, a metallic material such as aluminum (Al), titanium (Ti), silver (Ag), molybdenum (Mo), tungsten (W), copper (Cu), chromium (Cr) or the like, or an alloy of combination of any of these metal materials. These elements such as the scanning lines G may have a single-layer structure of a metal material or alloy, or may have a multilayer structure.

The first pixel electrode PE1 is constituted by, for example, a transparent conductive layer or a light-reflecting layer, or a stacked body of a transparent conductive layer and a light-reflecting layer. As in the case of the common electrode CE, the transparent conductive layer may be made of a transparent conductive material such as indium tin oxide (ITO) or indium zinc oxide (IZO).

Figure 6:
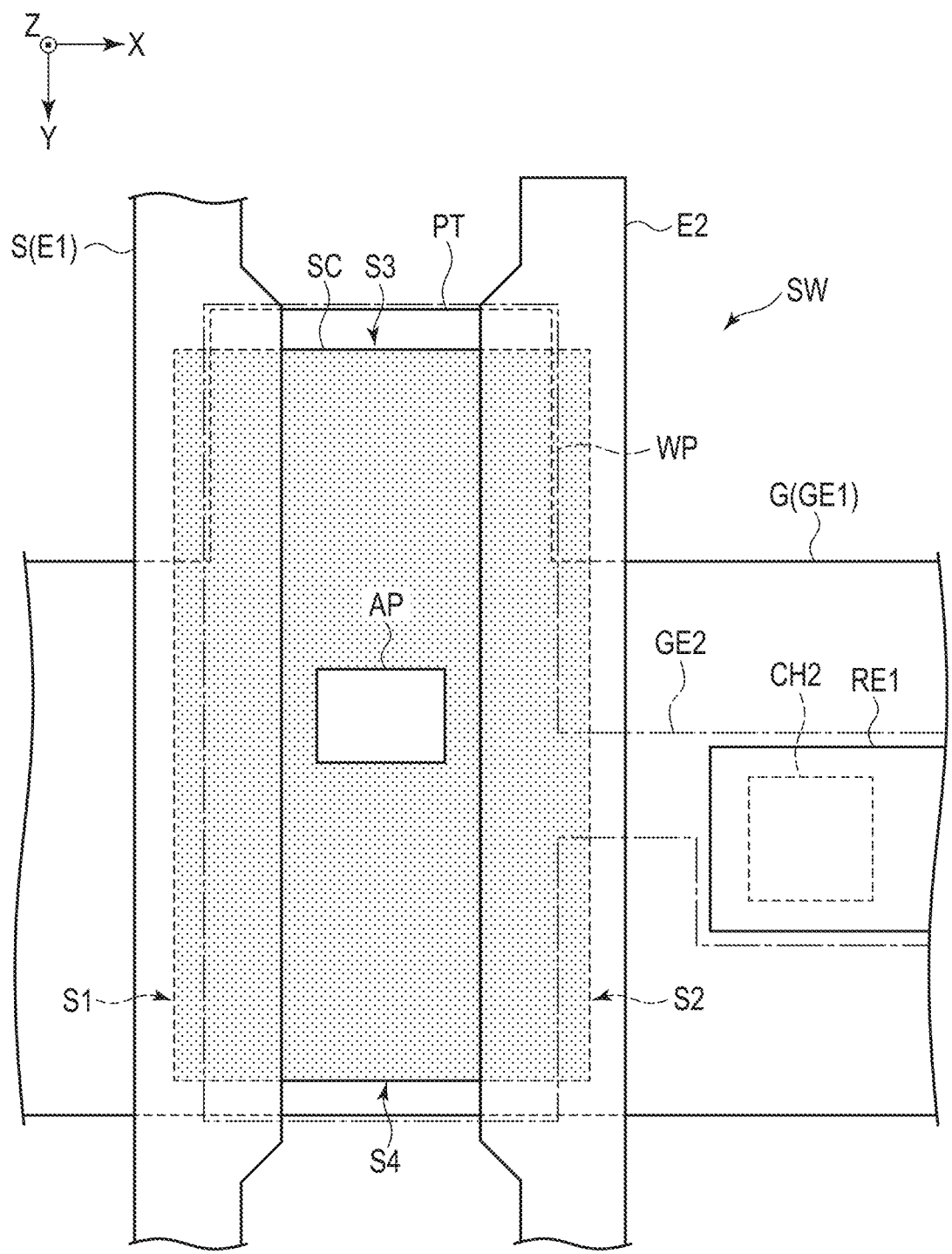
FIG. 6 is an enlarged plan view schematically showing a switching element in FIG. 5.
Figure 7:
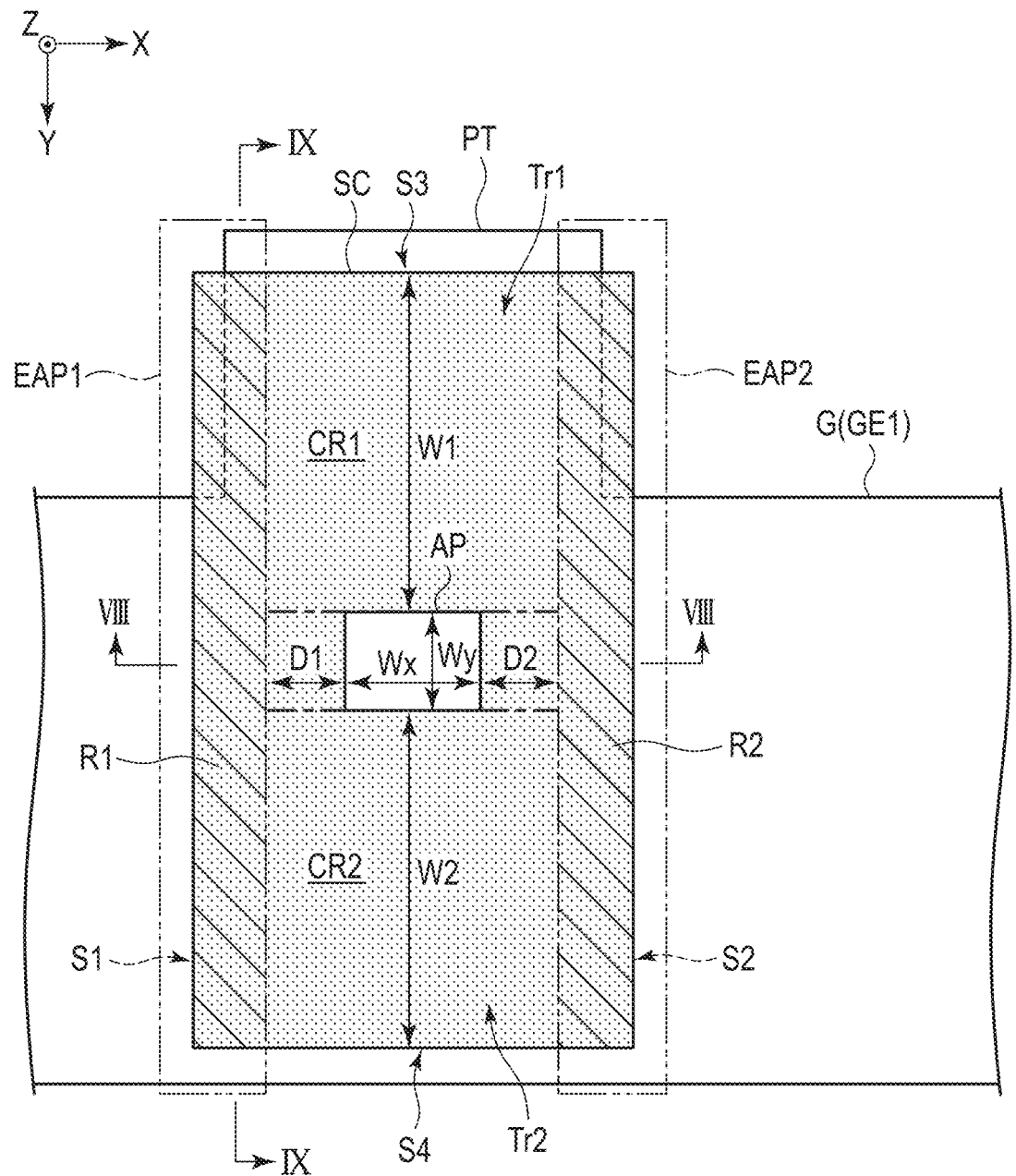
FIG. 7 is a plan view schematically showing a semiconductor layer and a scanning line in FIG. 6.

FIG. 6 is an enlarged plan view schematically showing a switching element SW shown in FIG. 5. FIG. 7 is a schematic plan view of the semiconductor layer SC and the respective scanning line G. In FIG. 6, the second gate electrode GE2 is indicated by a chain line.

In the example shown in FIGS. 6 and 7, the outer shape of the semiconductor layer SC is rectangular with a first side S1, a second side S2, a third side S3 and a fourth side S4. The first side S1 and the second side S2 are longer sides parallel to the second direction Y, and the third side S3 and the fourth side S4 are shorter sides parallel to the first direction X. Note that the shape of the semiconductor layer SC is not limited to rectangular.

In this embodiment, the semiconductor layer SC comprises an aperture AP in the center. The aperture AP is located between the signal line S (the first electrode E1) and the respective second electrode E2 along the first direction X. In the example shown in FIGS. 6 and 7, the aperture AP is of a rectangular shape elongated along the first direction X. Note that the aperture AP may be circular or oval.

The scanning line G (the first gate electrode GE1) includes a protruding portion PT protruding towards the third side S3 at a position overlapping the semiconductor layer SC. In the example shown in FIG. 6, the protruding portion PT protrudes from the third side S3 above in the figure. With the protruding portion PT having such a configuration, thus provided, most part of the semiconductor layer SC overlaps the respective scanning line G. The aperture AP as well overlaps the respective scanning line G.

Note here that it suffices if the scanning line G (the first gate electrode GE1) overlaps the channel region, in particular, of the semiconductor layer SC (that is, the first channel region CR1 and the second channel region CR2, as will be described later). It may be of such a configuration that the aperture AP and the respective scanning line G (the first gate electrode GE1) do not overlap each other. In the case of the configuration in which the aperture AP and the scanning line G (the first gate electrode GE1) do not overlap, for example, the scanning line G (the first gate electrode GE1) may have an opening that overlaps the aperture AP.

The second gate electrode GE2 has a wide portion WP at the position overlapping the semiconductor layer SC. The wide portion WP is rectangular in shape as shown in FIG. 6, for example, and overlaps the most part of the semiconductor layer SC. In the example of FIG. 6, the wide portion WP protrudes from the third side S3 above in the figure. Further, the wide portion WP protrudes from the fourth side S4 below in the figure. The aperture AP as well overlaps the wide portion WP.

Note that it suffices if the wide portion WP overlaps, in particular, the channel region of the semiconductor layer SC (the first channel region CR1 and the second channel region CR2, which will be described later). It may be of such a configuration that the aperture AP and the wide portion WP do not overlap each other. In the case of the configuration in which the apertures AP and the wide portion WP do not overlap each other, for example, the wide portion WP may have an opening that overlaps the aperture AP.

As described above, it suffices if the first gate electrode GE1 and the second gate electrode GE2 overlap the channel region of the semiconductor layer SC (the first channel region CR1 and the second channel region CR2, which will be described later), and either one or both of the first gate electrode GE1 and the second gate electrode GE2 may be of such a configuration that it has an opening in the region overlapping the aperture AP of the semiconductor layer SC.

One of the advantages obtained by the configuration in which the first gate electrode GE1 and the second gate electrode GE2 overlap the aperture AP of the semiconductor layer SC is that light leakage and the shift of the threshold voltage Vth can be suppressed as the light from an external light source enters the semiconductor layer SC, and as a result, the display quality can be further improved.

On the other hand, one of the advantages of the configuration in which that the first gate electrode GE1 and the second gate electrode GE2 do not overlap the aperture AP of the semiconductor layer SC is that the parasitic capacitances of the transistors Tr1 and Tr2 can be reduced, which makes it possible to increase the size of the panel and the higher frame rate, as well as to lower power consumption. Further, when the configuration of this embodiment is applied to the transparent display described above, the degree of transparency of the transparent display can be further improved by forming an opening in a region of the first gate electrode GE1 and the second gate electrode GE2, which overlaps the apertures AP of the semiconductor layer SC.

Whether or not to provide an opening in the area overlapping the apertures AP in the semiconductor layer SC in at least one of the first gate electrode GE1 and the second gate electrode GE2, can be determined according to the specifications of the display device.

FIG. 7 shows the shape of a first aperture EAP1 and a second aperture EAP2 formed in the insulating layer 12, which will be described later. The first aperture EAP1 and the second aperture EAP2 both have a shape elongated along the second direction Y. The first aperture EAP1 overlaps an end portion of the semiconductor layer SC, which includes the first side S1. The second aperture EAP2 overlaps an end portion of the semiconductor layer SC, which includes the first side S1. The aperture AP is located between the first aperture EAP1 and the second aperture EAP2 along the first direction X.

The semiconductor layer SC includes a first region R1 (a source region) in contact with the respective signal line S and a second region R2 (a drain region) in contact with the second electrode E2. In FIG. 7, the first region R1 and the second region R2 are marked with a shaded pattern. For example, the first region R1 and the second region R2 have a shape elongated over between the third side S3 and the fourth side S4.

The semiconductor layer SC further includes a first channel regions CR1 and a second channel region CR2 aligned along the second direction. The first channel region CR1 is a region located between the first region R1 and the second region R2 along the first direction X, and between the aperture AP and the third side S3 along the second direction Y. The second channel region CR2 is a region located between the first region R1 and the second region R2 along the first direction X and between the aperture AP and the fourth side S4 along the second direction Y. Both the first channel region CR1 and the second channel region CR2 entirely overlap the respective scanning line G and the respective second gate electrode GE2.

The first channel region CR1 constitutes the first transistor Tr1 together with the respective scanning line G, the second gate electrode GE2, the respective signal line S and part of the second electrode E2. The second channel region CR2 constitutes the second transistor Tr2 together with the respective scanning line G, the second gate electrode GE2, the respective signal line S and some other part of the second electrode E2.

The first channel region CR1 has a first channel width W1 taken along the second direction Y. The second channel region CR2 has a second channel width W2 taken along the second direction Y. The first channel width W1 and the second channel width W2 are the same as each other, for example.

Along the first direction X, the aperture AP is located between the first region R1 and the second region R2. Along the second direction Y, the aperture AP is located between the first channel region CR1 and the second channel region CR2.

The aperture AP has a width Wx taken along the first direction X. In the example shown in FIG. 7, the width Wx is greater than a distance D1 between the aperture AP and the first region R1 along the first direction X (Wx>D1). The width Wx is also greater than a distance D2 between the aperture AP and the second region R2 along the first direction X (Wx>D2). The distances D1 and D2 are, for example, the same as each other.

The aperture AP has a width Wy along the second direction Y. In the example shown in FIG. 7, the width Wy is sufficiently less than the first channel width W1 and the second channel width W2 (Wy<W1, W2).

Figure 8:
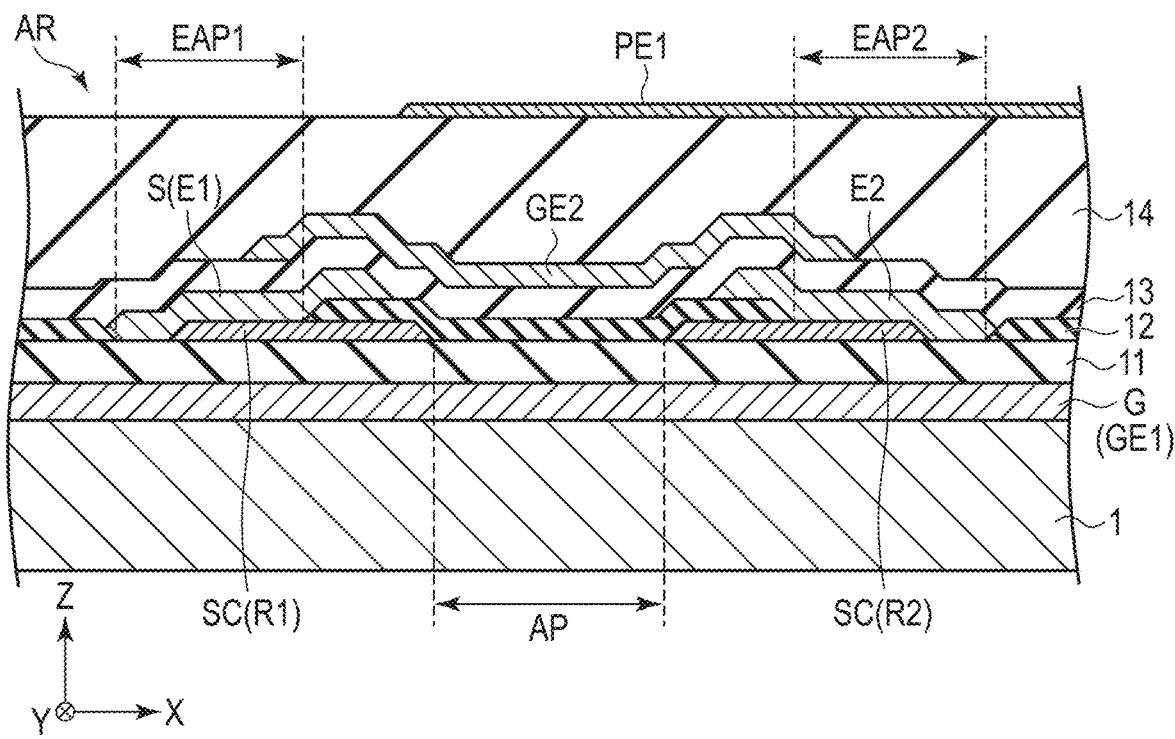
FIG. 8 is a schematic cross-sectional view of the array substrate taken along line VIII-VIII in FIG. 7.
Figure 9:
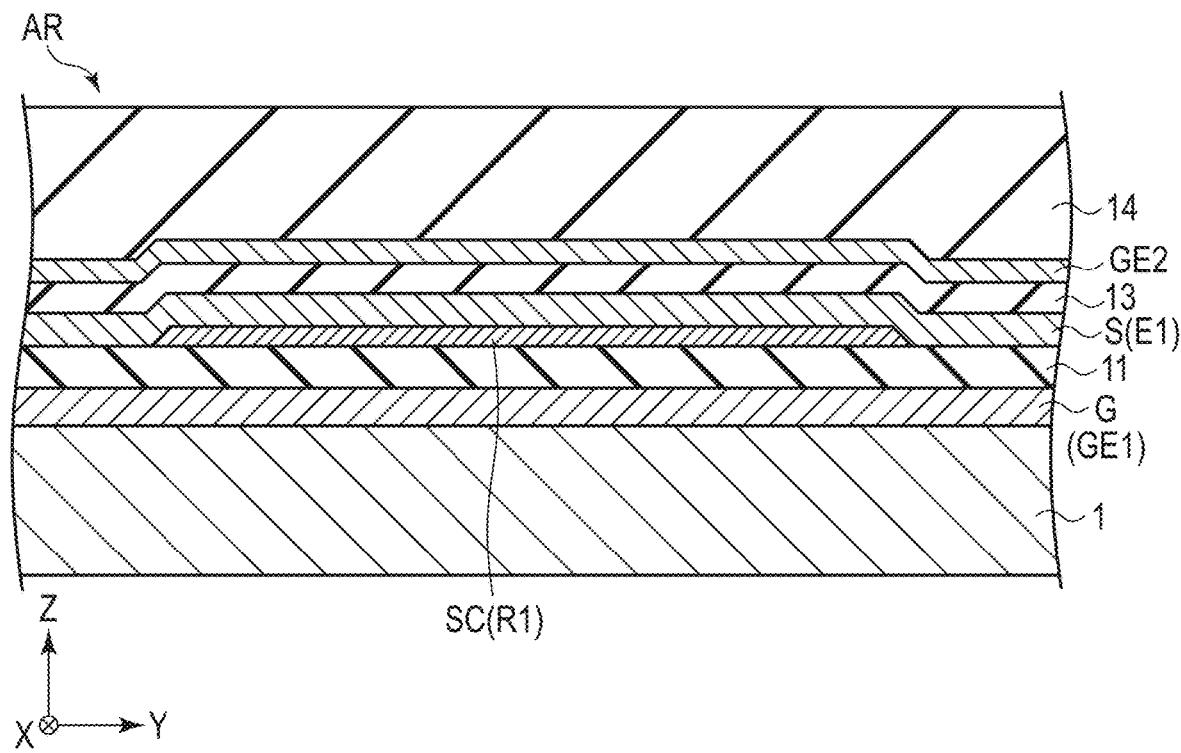
FIG. 9 is a schematic cross-sectional view of the array substrate taken along line IX-IX in FIG. 7.

FIG. 8 is a schematic cross-sectional view of the array substrate AR taken along line VIII-VIII in FIG. 7. FIG. 9 is a schematic cross-sectional view of the array substrate AR taken along line IX-IX in FIG. 7. The array substrate AR further comprises an insulating layers 11, 12, 13 and 14 in addition to the first base 1 and the elements shown in and FIGS. 5 to 7, described above. In this embodiment, the insulating layer 13 is an example of a first insulating layer and the insulating layer 12 is an example of a second insulating layer.

The scanning lines G are located on the first base 1. The insulating layer 11 covers the scanning lines G. The semiconductor layer SC is disposed on the insulating layer 11. The insulating layer 12 covers the semiconductor layer SC and the insulating layer 11.

The signal lines S and the second electrodes E2 are disposed on the insulating layer 12. The insulating layer 12 includes the first apertures EAP1 and the second apertures EAP2, described above. The signal lines S are brought into contact with the respective first regions R1 of the semiconductor layer SC via the respective first apertures EAP1. The second electrodes E2 are brought into contact with the respective second regions R2 of the semiconductor layer SC via the respective second apertures EAP2.

The insulating layer 13 covers the signal lines S, the second electrodes E2 and the insulating layer 12. The second gate electrode GE2 is located on the insulating layer 13. The insulating layer 14 covers the second gate electrodes GE2 and the insulating layer 13.

The first pixel electrodes PE1 are disposed on the insulating layer 14. The first pixel electrodes PE1 overlap the respective apertures AP along the third direction Z. Note that the first pixel electrode PE1 shown in FIG. 8 is not contained by the pixel PX which includes the semiconductor layer SC shown in FIG. 8, but contained by the adjacent pixel PX (see FIG. 5). In FIG. 8, no layers are not shown above the first pixel electrode PE1, but the first pixel electrode PE1 may be covered by an insulating layer.

The insulating layers 11, 12 and 13 are formed, for example, of an inorganic insulating material such as silicon oxide (SiO), silicon nitride (SiN), silicon oxynitride (SiON). The insulating layers 11, 12 and 13 may each have a single-layer structure or a multilayer structure. The insulating layer 14 is formed of an organic insulating material such as acrylic resin. The insulating layer 14 serves as a planarization layer that planarizes unevenness caused by the switching elements SW, etc.

Note that the contact holes CH1 and CH3 shown in FIG. 5 are formed in the insulating layers 11 and 12, the contact holes CH2 and CH4 are formed in the insulating layer 13, and the contact hole CH5 is formed in the insulating layer 14.

The insulation layer 12 is formed in the region excluding the first aperture EAP1 and the second aperture EAP2. That is, the insulating layer 12 covers the first channel region CR1 and the second channel region CR2 shown in FIG. 7. In the example shown in FIG. 8, the insulating layer 12 overlaps the apertures AP of the semiconductor layer SC along the third direction Z. Specifically, the insulating layer 12 fills the inside of the aperture AP. Since the cross-section of FIG. 9 corresponds to the first aperture EAP1, the cross-section does not include the insulating layer 12. Note that the cross-sectional structure of the array substrate AR in the second region R2 is similar to the cross-sectional structure of the first region R1 shown in FIG. 9.

When forming the semiconductor layer SC, the signal line S and the second electrode E2, first, the semiconductor layer SC is formed on the insulating layer 11, and then, a conductive layer, which gives rise to the signal lines S and the second electrodes E2, is deposited thereabove. The conductive layer is then patterned by dry etching, for example, to form the signal lines S and the second electrodes E2 each into a predetermined shape.

The insulating layer 12 plays a role of protecting the channel regions CR1 and CR2 of the semiconductor layer SC in the patterning. That is, if the insulating layer 12 is not present, the channel regions CR1 and CR2 are damaged by the etching for forming the signal lines S and the second electrodes E2, which may cause adverse effect on the characteristics of the transistors Tr1 and Tr2. By contrast, in this embodiment, the insulating layer 12 including the first aperture EAP1 and the second aperture EAP2 is formed on the semiconductor layer SC, and the signal lines S and the second electrodes E2 are brought into contact with the semiconductor layer SC via the apertures AP1 and EAP2. With this configuration, the channel regions CR1 and CR2 can be protected by the insulating layer 12 from the etching.

The thicknesses of the elements shown in FIGS. 8 and 9 are not particularly limited, but, for example, the thickness of the first base 1 is 0.5 mm, that of the scanning lines G is 400 nm, that of the insulating layer 11 is 500 nm, and that of the semiconductor layer SC is 70 nm, that of the signal lines S and the second electrodes E2 is 600 nm, that of the insulating layer 13 is 300 nm, that of the second gate electrodes GE2 is 150 nm, that of the insulating layer 14 is 3000 nm and that of the first pixel electrodes PE1 is 50 nm.

Next, an example of the advantageous effects exhibited by this embodiment will be described.

Figure 10:
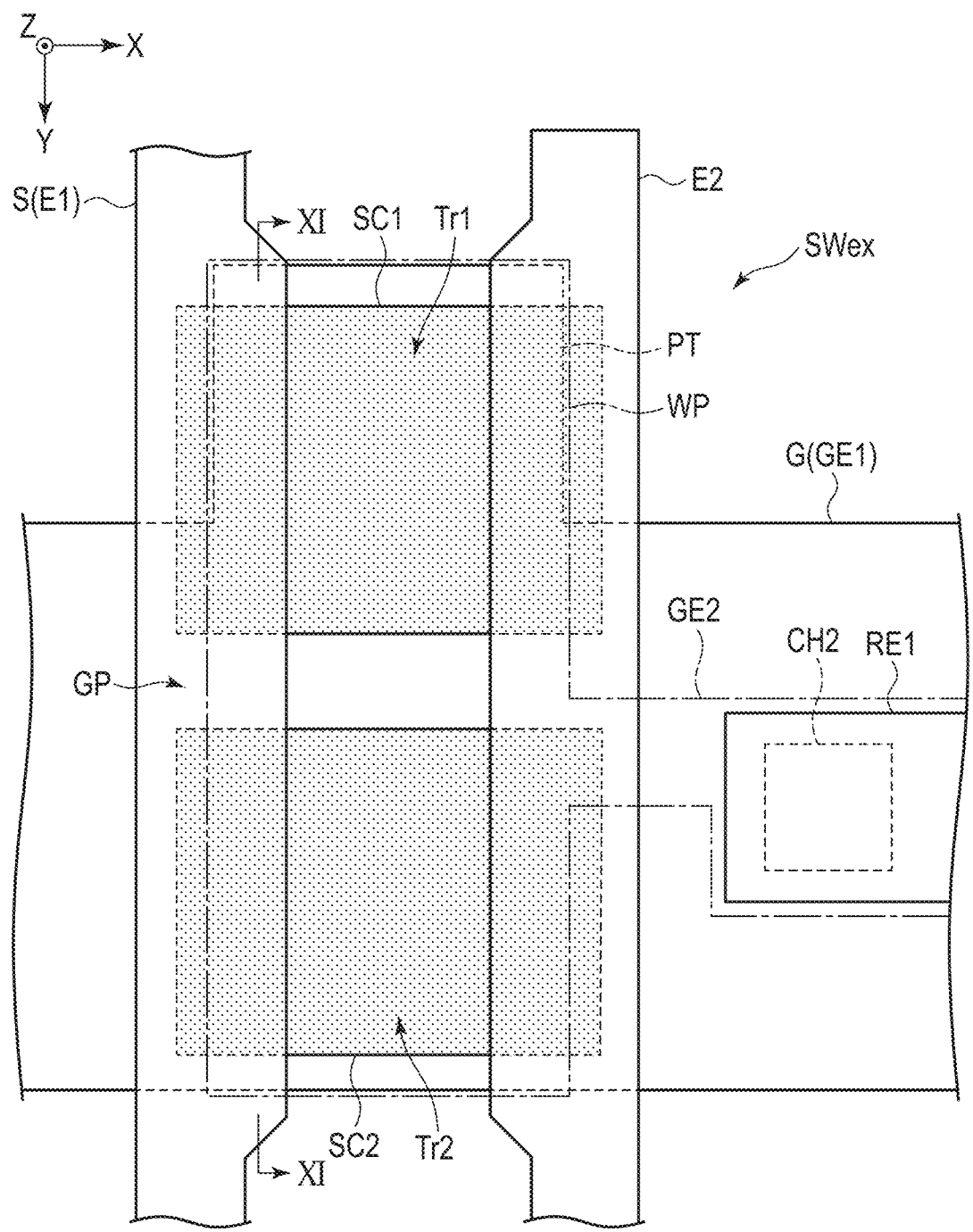
FIG. 10 is a plan view schematically showing a switching element according to a comparative example.

FIG. 10 is a schematic plan view of a switching element SWex of a comparative example. The switching element SWex comprises two semiconductor layers SC1 and SC2 aligned along the second direction Y. Between the semiconductor layers SC1 and SC2, a gap GP is formed. The semiconductor layer SC1 constitutes the first transistor Tr1, and the semiconductor layer SC2 constitutes the second transistor Tr2.

FIG. 11 a schematic cross-sectional view showing an array substrate AR of the comparative example, taken along line XI-XI in FIG. 10. In the comparative example, there is the gap GP between the semiconductor layers SC1 and SC2, and therefore the signal line S (the first electrode E1), the insulating layer 13 and the second gate electrode GE2 is recessed according to the shape of the gap GP.

When such recesses are created, the thickness of the insulating layer 13 is not constant. More specifically, a thickness t1 of the portion of the insulating layer 13, which is located above the flat surfaces of the semiconductor layers SC1 and SC2, may become less than a thickness t2 of the portion of the insulating layer 13, which is located above the end portions (tapered portions) of the semiconductor layers SC1 and SC2 (t1>t2). In particular, above the gap GP, complex deformation of the insulating layer 13 and the like occurs, and therefore differences are likely to occur between the thicknesses t1 and t2.

In the portion of the insulation layer 13, where the thickness is reduced, the dielectric breakdown voltage between the signal line S and the respective second gate electrode GE2 is lower than that of the other portion, and therefore there is a risk that dielectric breakdown may occur. If dielectric breakdown occurs, the signal line S and the respective second gate electrode GE2 are connected, resulting in a display failure. The risk of dielectric breakdown may occur between the second electrode E2 and the respective second gate electrode GE2 as well.

By contrast, in this embodiment, as shown in FIG. 9, there is no such a structure corresponding to the gap GP created in the semiconductor layer SC below the signal line S and the respective second gate electrode GE2. Similarly, below the second electrode E2 and the respective second gate electrode GE2, the semiconductor layer SC does not include a structure corresponding to the gap GP. In other words, the semiconductor layer SC has such a shape as shown in FIG. 10, where the semiconductor layers SC1 and SC SC2 are connected to each other by the respective ends along the first direction X. With such a configuration, thin portions are not easily created in the insulating layer 13 between the signal line S and the respective second gate electrode GE2 and between the second electrode E2 and the respective second gate electrode GE2. As a result, the risk of dielectric breakdown is reduced and the reliability of the array substrate AR and the display device DSP can be improved.

As shown in FIG. 7, the aperture AP is located between the first region R1 and the second region R2. More specifically, the aperture AP is located between the signal line S and the respective second electrode E2 as shown in FIG. 6. In such a configuration, the signal line S and the respective second electrode E2 are not present in the portion of the insulation layer 13, where step portions are created due to the aperture AP. Therefore, dielectric breakdown of the insulation layer 13, which may be caused by the aperture AP, can be suppressed.

Note that if the aperture AP is not provided in the semiconductor layer SC, a single transistor with a great channel width is formed. In this case, a large current tends to flow in the semiconductor layer SC. If the current becomes excessively large, the semiconductor layer SC may be destroyed. By contrast, when an aperture AP is provided in the semiconductor layer SC as in this embodiment, two channel regions CR1 and CR2 with a small channel width are formed in the semiconductor layer SC. In this configuration, a large current does not easily flow in the semiconductor layer SC, and as a result, the destruction of the semiconductor layer SC can be suppressed. Further, from the viewpoint of promoting heat radiation from the semiconductor layer SC as well, it is preferable to form two channel regions CR1 and CR2 with a smaller channel width in the semiconductor layer SC, as compared to the case where a single transistor with a great channel width is used.

In addition to the above, various other advantageous effects can be obtained from this embodiment.

Second Embodiment

The second embodiment will now be described below. The configurations of the array substrate AR and the display device DSP of this embodiment are similar to those of the first embodiment unless it is not particularly referred thereto.

FIG. 12 is a schematic plan view of a switching element SW of the second embodiment. In the example in this figure, the semiconductor layer SC comprises two apertures AP (AP1 and AP2). The apertures AP1 and AP2 have the same shape, for example, and aligned along the second direction Y with an interval therebetween.

In the example shown in FIG. 12, the switching element SW contains a first transistor Tr1 including a first channel region CR1 between the third side S3 and the aperture AP1, a second transistor Tr2 including a second channel region CR2 between the apertures AP1 and AP2, a third transistor Tr3 including a third channel region CR3 between the aperture AP2 and the fourth side S4. The transistors Tr1, Tr2 and Tr3 are connected in parallel.

Note that the number of apertures AP in the semiconductor layer SC is not limited to two, but may be three or more. Even when the semiconductor layer SC includes a plurality of apertures AP as in this embodiment, advantageous effects similar to those of the first embodiment can be obtained.

Based on the display device and array substrate described above as embodiments of the present invention, a person having ordinary skill in the art may achieve a display device with an arbitral design change; however, as long as they fall within the scope and spirit of the present invention, all of such display devices and array devices are encompassed by the scope of the present invention.

A skilled person would conceive various changes and modifications of the present invention within the scope of the technical concept of the invention, and naturally, such changes and modifications are encompassed by the scope of the present invention. For example, if a skilled person adds/deletes/alters a structural element or design to/from/in the above-described embodiments, or adds/deletes/alters a step or a condition to/from/in the above-described embodiment, as long as they fall within the scope and spirit of the present invention, such addition, deletion, and altercation are encompassed by the scope of the present invention.

Furthermore, regarding the present embodiments, any advantage and effect those will be obvious from the description of the specification or arbitrarily conceived by a skilled person are naturally considered achievable by the present invention.

What is claimed is:

1. An array substrate comprising:
a semiconductor layer;
a first electrode in contact with the semiconductor layer;
a second electrode separated from the first electrode and in contact with the semiconductor layer;
a first insulating layer which covers the first electrode and the second electrode;
a second insulating layer disposed below the first insulating layer and covering the semiconductor layer; and
a gate electrode disposed above the first insulating layer and opposing the semiconductor layer,
wherein
the semiconductor layer comprises an aperture located between the first electrode and the second electrode in plan view, the second insulating layer includes a first aperture and a second aperture that overlap the semiconductor layer, the first electrode is in contact with the semiconductor layer via the first aperture, and the second electrode is in contact with the semiconductor layer via the second aperture.

2. The array substrate of claim 1, further comprising:
a scanning line located below the semiconductor layer and connected to the gate electrode;
wherein
the semiconductor layer overlaps the gate electrode and the scanning line.

3. The array substrate of claim 1, wherein
the gate electrode overlaps the aperture.

4. The array substrate of claim 1, wherein
the first electrode and the second electrode are aligned along a first direction,
the semiconductor layer includes:
a first region in contact with the first electrode;
a second region in contact with the second electrode; and
a first channel region and a second channel region, located between the first region and the second region along a first direction, and aligned along a second direction that intersects the first direction, and
the aperture is located between the first channel region and the second channel region along the second direction.

5. The array substrate of claim 4, wherein
a width of the aperture along the first direction is greater than a distance between the aperture and the first region along the first direction.

6. The array substrate of claim 4, wherein
a width of the aperture along the first direction is greater than a distance between the aperture and the second region along the first direction.

7. The array substrate of claim 4, wherein
a width of the aperture along the second direction is less than a width of the first channel region or the second channel region along the second direction.

8. The array substrate of claim 4, wherein
the semiconductor layer comprises a plurality of apertures including the aperture, aligned along the second direction.

9. The array substrate of claim 1, wherein
the aperture of the semiconductor layer overlaps the second insulating layer.

10. The array substrate of claim 1, wherein
the semiconductor layer includes a first channel region and a second channel region, covered by the second insulating layer, and
the aperture of the semiconductor layer is located between the first channel region and the second channel region in plan view.

11. The array substrate of claim 1, wherein
the aperture of the semiconductor layer is located between the first aperture and the second aperture in plan view.

12. The array substrate of claim 1, wherein
the first electrode and the second electrode are aligned along a first direction, and
the semiconductor layer has a shape elongated along a second direction that intersects the first direction.

13. The array substrate of claim 12, wherein
the aperture has a shape elongated along the first direction.

14. A display device comprising:
an array substrate of claim 1;
a counter substrate opposing the array substrate; and
a display functional layer disposed between the array substrate and the counter substrate.

15. The display device of claim 14, wherein
the array substrate comprises a pixel electrode connected to the second electrode, and
the counter substrate comprises a common electrode opposing the pixel electrode.

16. The display device of claim 14, wherein
the display functional layer is an electrophoretic layer.

17. An array substrate comprising:
a semiconductor layer;
a first electrode in contact with the semiconductor layer;
a second electrode separated from the first electrode and in contact with the semiconductor layer;
a first insulating layer which covers the first electrode and the second electrode;
a gate electrode disposed above the first insulating layer and opposing the semiconductor layer, and
a scanning line located below the semiconductor layer, connected to the gate electrode, and extending along a first direction,
wherein
the first electrode and the second electrode are aligned along the first direction,
the semiconductor layer comprises:
a first side and a second side parallel to a second direction that intersects the first direction;
a third side and a fourth side parallel to the first direction; and
an aperture between the first electrode and the second electrode in plan view, and
the scanning line comprises a protruding portion protruding towards the third side at a position overlapping the semiconductor layer.

18. The array substrate of claim 17, wherein
the gate electrode comprises a wide portion overlapping the semiconductor layer, and
the wide portion overlaps the aperture, the third side and the fourth side.

19. A display device comprising:
an array substrate of claim 17;
a counter substrate opposing the array substrate; and
a display functional layer disposed between the array substrate and the counter substrate.

20. The display device of claim 19, wherein
the array substrate comprises a pixel electrode connected to the second electrode, and
the counter substrate comprises a common electrode opposing the pixel electrode.

21. The display device of claim 19, wherein
the display functional layer is an electrophoretic layer.

* * * * *